(12) United States Patent
Majumder

(10) Patent No.: US 9,673,628 B2
(45) Date of Patent: Jun. 6, 2017

(54) CONTROL OF A MICROGRID

(71) Applicant: ABB Schweiz AG, Baden (CH)

(72) Inventor: Ritwik Majumder, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/304,747

(22) PCT Filed: Apr. 17, 2014

(86) PCT No.: PCT/EP2014/057865
§ 371 (c)(1),
(2) Date: Oct. 17, 2016

(87) PCT Pub. No.: WO2015/158386
PCT Pub. Date: Oct. 22, 2015

(65) Prior Publication Data
US 2017/0040800 A1    Feb. 9, 2017

(51) Int. Cl.
*H02J 3/26* (2006.01)
*H02J 3/32* (2006.01)

(52) U.S. Cl.
CPC . *H02J 3/26* (2013.01); *H02J 3/32* (2013.01)

(58) Field of Classification Search
CPC ... H02M 3/04; H02J 3/383; H02J 1/06; Y10T 307/685; Y02E 10/563
USPC .......................................................... 307/25
See application file for complete search history.

(56) References Cited

U.S. PATENT DOCUMENTS

| 9,270,117 B2* | 2/2016 | Umland ................... H02J 3/26 |
| 2006/0004531 A1* | 1/2006 | Ye ........................ G01R 19/2513 |
| | | 702/60 |
| 2009/0224729 A1 | 9/2009 | Li et al. |

(Continued)

FOREIGN PATENT DOCUMENTS

| DE | 102011078047 A1 | 12/2012 |
| DE | 102011115189 A1 | 3/2013 |

(Continued)

OTHER PUBLICATIONS

International Preliminary Report on Patentability Application No. PCT/EP2014/057865 completed: Jun. 17, 2016; Mailing Date: Jun. 17, 2016 8 pages.

(Continued)

*Primary Examiner* — Jared Fureman
*Assistant Examiner* — Michael Warmflash
(74) *Attorney, Agent, or Firm* — Whitmyer IP Group LLC

(57) ABSTRACT

A microgrid having a plurality of electrical phases A, B & C. The microgrid includes an energy storage connected to a first phase A and a second phase B. The microgrid also includes a first single-phase distributed generator (DG) connected to the first phase and configured for injecting power into the first phase. The microgrid also includes a second single-phase DG connected to the second phase and configured for injecting power into the second phase. The microgrid also includes a first single-phase load connected to the first phase. The microgrid also includes a second single-phase load connected to the second phase. The microgrid also includes a control system configured for controlling the microgrid such that power is redistributed from the second phase to the first phase via the energy storage.

7 Claims, 2 Drawing Sheets

(56) References Cited

U.S. PATENT DOCUMENTS

| | | | | |
|---|---|---|---|---|
| 2012/0235498 A1* | 9/2012 | Johnson | ............... | H02J 3/383 307/82 |
| 2014/0049117 A1* | 2/2014 | Rahman | ............... | H02J 4/00 307/82 |
| 2014/0100705 A1 | 4/2014 | Shi et al. | | |
| 2014/0375125 A1* | 12/2014 | Ye | ............... | H02J 3/24 307/26 |

FOREIGN PATENT DOCUMENTS

| | | |
|---|---|---|
| DE | 102011085676 A1 | 5/2013 |
| EP | 2348597 A1 | 7/2011 |
| EP | 2919352 A1 | 9/2015 |
| WO | 2012050501 A1 | 4/2012 |
| WO | 2014199628 A1 | 12/2014 |

OTHER PUBLICATIONS

International Search Report and Written Opinion of the International Searching Authority Application No. PCT/EP2014/057865 Completed: Dec. 9, 2014; Mailing Date: Dec. 18, 2014 11 pages.
Written Opinion of the International Preliminary Examining Authority Application No. PCT/EP2014/057865 Issued: Mar. 18, 2016 7 pages.

* cited by examiner

CONTROL OF A MICROGRID

TECHNICAL FIELD

The present disclosure relates to methods and devices for controlling an alternating current (AC) microgrid having at least two electrical phases and comprising at least one single-phase distributed generator (DG) connected to one of the at least two phases.

BACKGROUND

A microgrid is a localized grouping of electricity generation, energy storage, and loads that normally operates connected to a traditional centralized grid (macrogrid) via a point of common coupling (PCC). This single point of common coupling with the macrogrid can be disconnected, islanding the microgrid. Microgrids are part of a structure aiming at producing electrical power locally from many small energy sources, DGs. In a microgrid, a DG is connected via a converter which controls the output of the DG, i.e. the current injected into the microgrid.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection is lost during grid fault and the microgrid is islanded.

During islanding, there is a risk of imbalance in the microgrid due to the loss of power import from grid as well as loss of voltage control by the grid. For voltage control it is required to change control mode of the DGs. The power balancing is solved by fast storage action and immediate load shedding schemes.

In a microgrid, system stability is improved with application of energy storage for continuous real and reactive power injection that works as a stabilizer for the microgrid. The main control philosophy for such stabilizer is real and reactive power injection based on local frequency and voltage deviation, respectively. In most scenarios, a larger storage/stabilizer is economical. However, in a microgrid, depending on growth, expansion and with higher penetration of DGs, it may be required to add a new storage/stabilizer in an existing microgrid and that leads to scenarios with multiple stabilizers in the same microgrid.

In an alternating current (AC) system, the frequency is the same everywhere in steady state while voltage may differ depending on the power flow. However, in a microgrid with a continuous change in DG output, load switching and low inertia, there is continuous frequency and voltage fluctuation to a small scale. And the deviations are larger during large transients (like DG fault etc.). Frequency and voltage stability relates to minimum oscillations and overshoot with ability to come back to initial value (or any other steady state value within acceptable deviation) after a disturbance.

Single-phase operation of a microgrid is relevant in many application, like campus, facility or remote microgrids. With the presence of single-phase DGs and unequal loading, system unbalance is an issue, however within regulation limits the unbalance is not a major problem. For a grid connected microgrid, the balance of the grid (macrogrid) ensures power supply and tight regulation from the PCC side. However in islanded operation, the disparity of power generation, demand and priority of loads may differ greatly among the phases.

Energy storage can play an important role, but in single-phase operation where the phases are geographically separate, it is expensive to install storage wherever it is needed to maximum possible demand.

SUMMARY

It is an objective of the present invention to provide an improved method of controlling a microgrid having a plurality of phases and single-phase DGs and single-phase loads. Since the connected single-phase loads in the microgrid may have different priority, it is possible to shed load in one or two phases if needed to supply high priority loads connected those and/or in other phase. In accordance with the present invention, a multi-phase device comprising an energy storage can be used for power exchange between the phases.

According to an aspect of the present invention, there is provided a microgrid having a plurality of electrical phases. The microgrid comprises an energy storage connected to at least a first phase and a second phase of the plurality of phases. The microgrid also comprises a first single-phase distributed generator (DG) connected to the first phase and configured for injecting power into said first phase. The microgrid also comprises a second single-phase DG connected to the second phase and configured for injecting power into said second phase. The microgrid also comprises a first single-phase load connected to the first phase. The microgrid also comprises a second single-phase load connected to the second phase. The microgrid also comprises a control system configured for controlling the microgrid such that power is redistributed from the second phase to the first phase via the energy storage.

According to another aspect of the present invention, there is provided a method performed in a microgrid having a plurality of electrical phases. The method comprises redistributing power to a first phase of the plurality of phases from a second phase of the plurality of phases via an energy storage connected to at least the first phase and the second phase, in order to supply a first single-phase load connected to the first phase with a sufficient amount of power.

By means of the energy storage connected to both the first and second phases of the microgrid, power can be exchanged between the first and second phases, e.g. the storage may be charged by excess power from the second phase and power can be discharged from the storage to be injected into the first phase if needed, for instance to supply power to a critical single-phase load connected to the first phase. This may be especially useful in island operation, or in other cases where the power imported from the power grid (macrogrid) is not enough to (in addition to the power produced by the DGs in the microgrid) support all the loads in the microgrid. If there is excess power in the second phase, that excess power can be redistributed to the first phase via the storage. Also, if the critical load in the first phase has a higher priority than a load in the second phase, the second phase load may be disconnected or be supplied with reduced power (called load shedding herein) in order to obtain the excess power.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended, to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
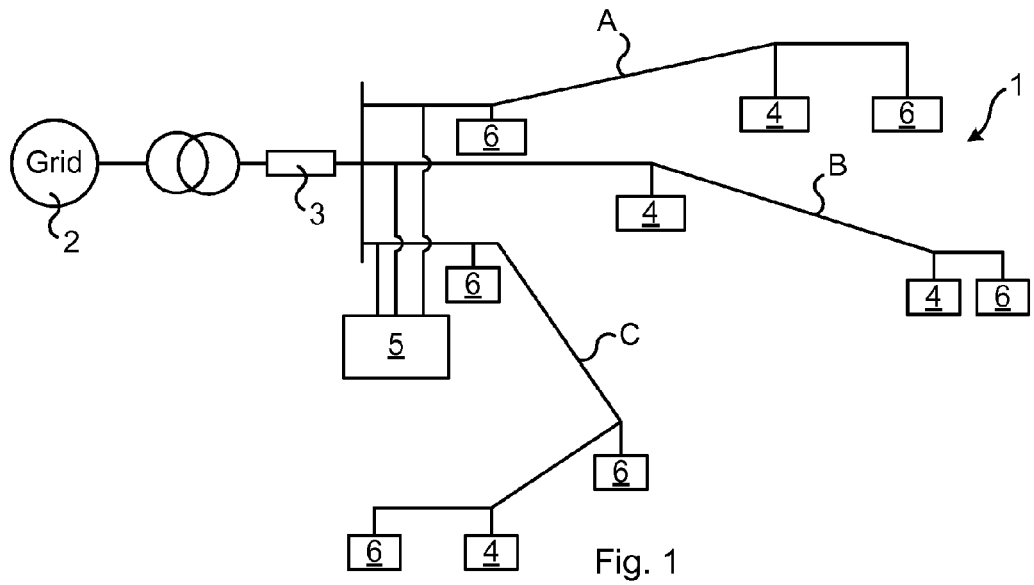
FIG. 1 is a schematic circuit diagram of an embodiment of a microgrid in accordance with the present invention.

FIG. 1 schematically illustrates an embodiment of a microgrid 1 of the present invention. The microgrid 1 is connected to a power grid (macrogrid) 2 via a circuit breaker or other switch 3. When the circuit breaker 3 is open, the microgrid 1 is islanded. The microgrid comprises a plurality of phases, here three phases A, B and C, each having at least one single-phase distributed generator (DG) 4 connected thereto and at least one single-phase load 6 connected thereto. Thus, the microgrid 1 may be viewed as a combination of three single-phase (could also be called one-phase) microgrids, one for each phase of the microgrid 1. However, all three single-phase grids are connected to the macrogrid 2 at the same point of common coupling (PCC) at the circuit breaker 3. At the PCC, an energy storage 5 (e.g. comprising a battery or flywheel) is connected to each of the phases, and is thus not a single-phase device as the DGs 4 and loads 6. As mentioned above, the single-phase grids may be geographically distant from each other, why it may be convenient that the multi-phase storage 5 is connected close to the PCC, but also other positions of the storage 5 may be considered, e.g. if all the phases are close to each other at some other point of the microgrid 1. The use of a multi-phase storage 5 allows for power exchange between the phases in accordance with the present invention. It may also be advantageous with an energy storage 5 connected to all or at least some of the phases of a microgrid in order to reduce the need for separate energy storages for each phase, reducing the cost of the microgrid. Each of the storage 5, the DGs 4 and the loads 6 is typically associated with a converter, e.g. a voltage sourced converter (VSC), controlled by a local control unit (storage controller, DG controllers and load controllers) part of a control system 7 (see FIG. 4) of the microgrid 1, for regulating power exchange between the storage/DG/load and the microgrid phases.

In some embodiments of the present invention, the microgrid 1 is a three-phase microgrid, wherein the energy storage 5 is connected to all the three phases A, B and C and the control system 7 is configured for distributing power between all the three phases via the energy storage.

Figure 2:
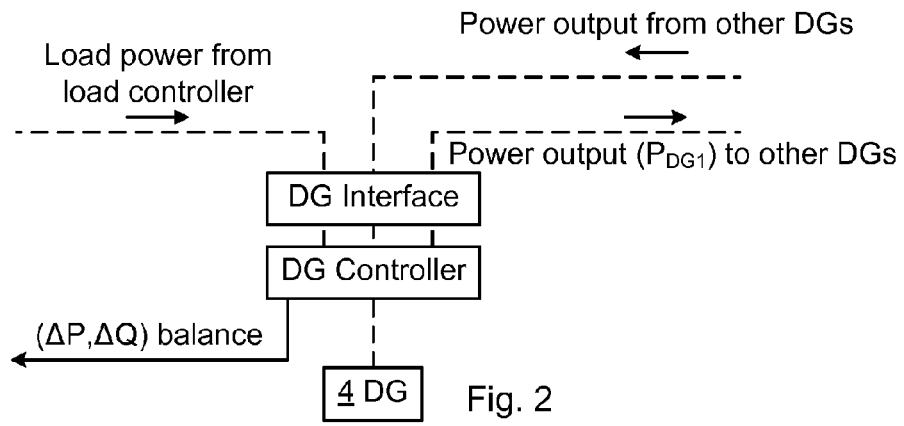
FIG. 2 is a schematic block diagram illustrating an example embodiment of power balance calculation for a DG, in accordance with the present invention.

FIG. 2 schematically illustrates a power balance calculation made by a DG controller for a DG 4. The DG controller receives information about the amount of power required by load(s) 6 from load controller(s) as well as information about power output of other DG(s), if any, of the phase A, B or C to which the DG 4 is connected. The DG controller also sends information about the power output $P_{DG}$ of its own DG 4 to DG controllers of other DG(s) of the phase. Based on this received and sent information, the DG controller calculates the power balance of the phase, e.g. presented as difference (positive or negative) between supply and demand of active power $\Delta P$ and reactive power $\Delta Q$.

Figure 3:
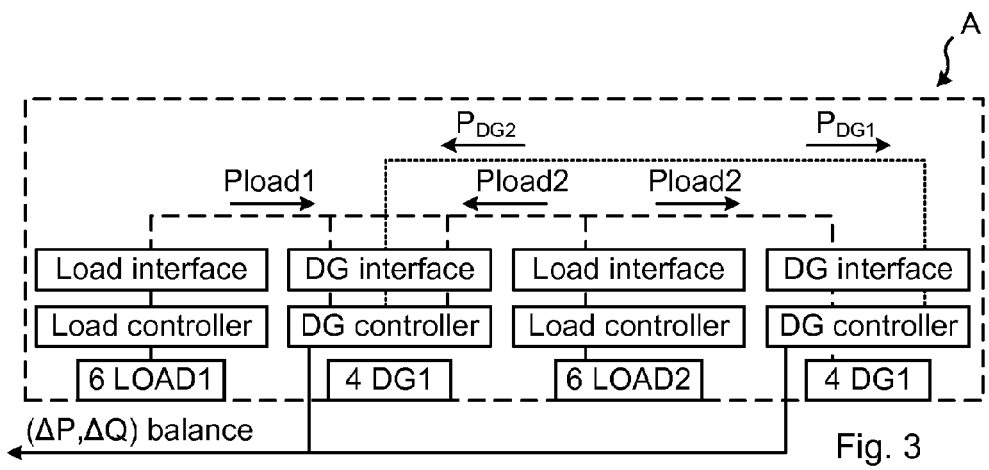
FIG. 3 is a schematic block diagram illustrating an example embodiment of power balance calculation for a phase, in accordance with the present invention.

FIG. 3 expands the power balance calculation of FIG. 2 to a whole phase A. Each load has a load controller which sends/broadcasts its power requirement $P_{laod}$ to other controllers (especially DG controllers) of the phase. Similarly, and as discussed in relation to FIG. 2, each DG controller sends/broadcasts its power output capability $P_{DG}$ to other controllers (especially DG controllers) of the phase. Each DG controller of the phase A receives the sent information from other controllers and calculates the power balance $\Delta P$ and $\Delta Q$ of the phase. Information about the power balance is e.g. sent to the storage controller of the three-phase storage 5.

Figure 4:
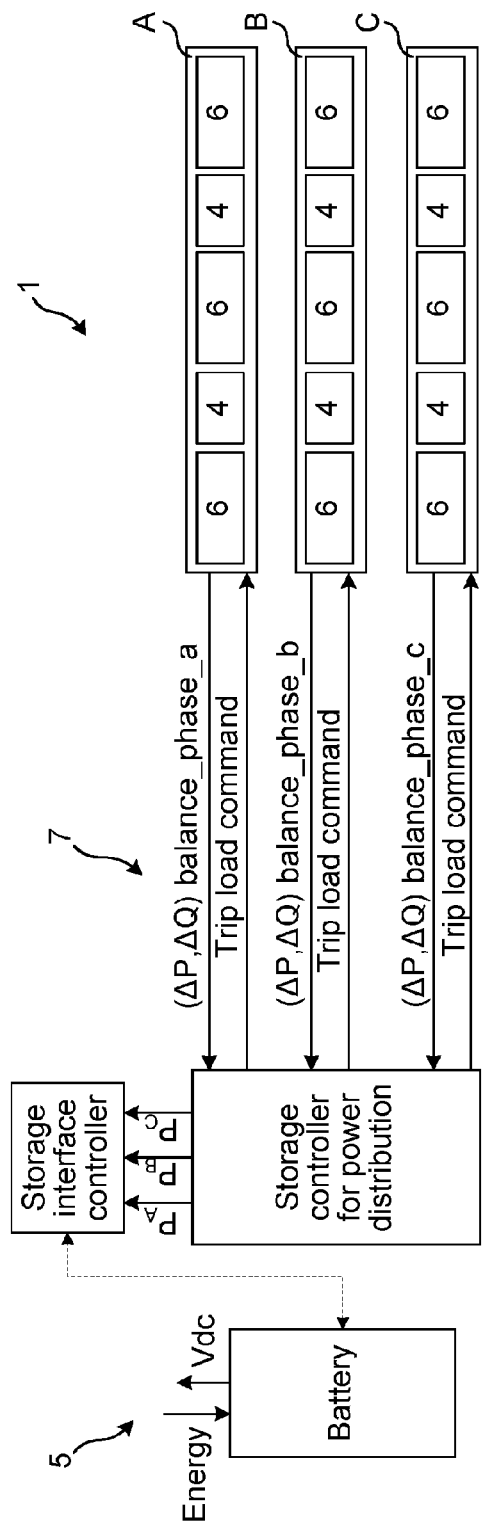
FIG. 4 is a schematic block diagram illustrating an example embodiment of power control of a three-phase storage, in accordance with the present invention.

FIG. 4 illustrates how the power balance calculations of FIGS. 2 and 3 are used for calculating the redistribution between the phases by the controller of the storage 5. The control system 7 comprises a storage controller for calculating the power distribution between the phases, as well as a storage interface controller for controlling the converter interface, e.g. a VSC, for executing the calculated power distribution. Both the storage controller and the interface controller are comprised in the storage 5, as well as an energy storing device such as a battery or flywheel and the converter interface. The three phases A, B and C are schematically shown, each with a plurality of DGs 4 and loads 6. As mentioned in relation to FIG. 3, each DG's controller sends the power balance $\Delta P$ and $\Delta Q$ of its phase A, B or C to the storage controller. The storage controller calculates how much power to redistribute from each phase to another phase, e.g. from phases B and C to phase A, and sends instructions to the storage interface controller about the amount of power to inject into phase A ($P_A$) and extract from phase B ($P_B$) and phase C ($P_C$). The storage interface controller then controls the converter interface (e.g. a VSC, not shown) of the storage 5, as well as e.g. a battery, for performing the injection and extraction. The extracted power is stored as electrical energy in the storage 5 e.g. in a battery which battery provides a direct current (DC) voltage Vdc for power injection into the phase A.

Figure 5:
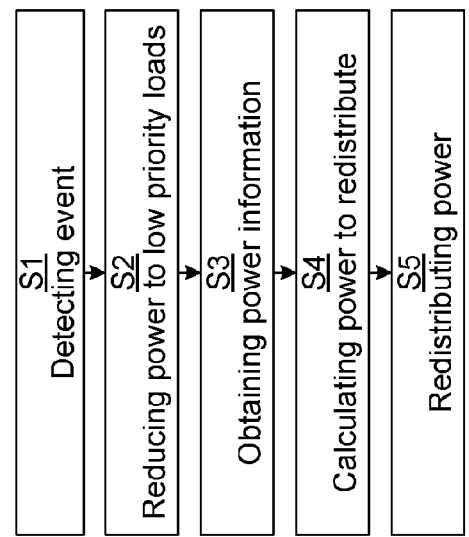
FIG. 5 is a schematic flow chart of an embodiment of a method of the present invention.

FIG. 5 is a schematic flow chart of an embodiment of a method of the present invention. The method is performed in a microgrid 1 having a plurality of electrical phases A, B and C. The method comprises redistributing S5 power to a first phase A of the plurality of phases from a second phase B of the plurality of phases via an energy storage 5 connected to at least the first phase and the second phase, in order to supply a first single-phase load 6 (typically a critical load) connected to the first phase with a sufficient amount of power.

Optionally, the method may comprise, before the step of redistributing S5 power, detecting S1 an event, wherein the redistributing S5 is commenced in response to the detected S1 event. In some embodiments, the detected S1 event is any of obtaining an indication that the microgrid 1 has lost its connection to a power grid 2, obtaining an indication that the power import to the microgrid 1 from a power grid 2 is below a predetermined threshold and/or obtaining an indication that there is a voltage drop in the microgrid 1.

In some embodiments of the present invention, the method comprises, before the step of redistributing S5 power, reducing S2 an amount of power supplied to a second single-phase load 6 connected to the second phase B.

In some embodiments of the present invention, the method comprises, before the step of redistributing S5 power, obtaining S3 information about available power generated by DG(s) 4 in each of the first and second phases A and B, as well as information about power demanded by loads 6 in each of the first and second phases, and calculating S4 the amount of power to be redistributed S5 based on the obtained S3 information. In some embodiments, the power demanded by loads 6 only comprises power demanded by loads which have been predetermined to have a high priority. Typically, loads with a low priority have then been cut off (shedded) from power supply.

EXAMPLE

It is assumed that the microgrid 1 is used for single-phase operation with multiple single-phase DGs 4 and loads 6 connected e.g. as shown in FIG. 1. A three phase energy storages is connected at the PCC.

In islanded mode the circuit breaker 3 is open to disconnect the microgrid from the grid 2. Low priority loads 6 are shedded during islanding in all the phases A, B and C.

The power generation and load demand in each phase are broadcasted by the local control units of the control system 7 to each other and/or to a central control unit (e.g. the storage controller) of the control system 7 in order to calculate the power balance (produced power by the DGs 4 minus consumed power by the loads 6) in each phase.

The positive power balances in e.g. phases B and C (this may be ensured through load shedding) are used to inject power in the phase A having a critical load by means of phase wise control of the storage 5.

An example of the power balance calculation in a DG 4 has been shown in FIG. 3 with load power and other DG power output. An example of the power balance calculation over a whole phase has been shown in FIG. 4.

An example of the power control scheme by means of the three-phase storage 5 is shown in FIG. 4 where each DG controller calculates the power balance and the power balance from each phase are sent to the storage controller of the storage 5.

Since each DG 4 (i.e. the controller of each DG) separately calculates the power balance for the phase separately, they are compared and if they differ, the old data may be discarded and a new round of power balance calculation may be initiated.

The storage controller of the control system 7 for power distribution calculates the power import and export for individual phases and sends commands for this to the storage interface controller.

The power injection in phase A could be sum of the power extracted from the other two phases B and C while the storage's 5 own stored power compensates for losses. Depending on the amount of power stored in the storage, a part of the injected power could alternatively be supplied from the storage 5. Conversely, if the positive power balance of phases B and C gives power in excess of what is needed in phase A, the excess may be stored in the storage 5. Of course, instead of two phases supplying power to one phase, one phase may supply power to two phases in a similar way.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A microgrid having a plurality of electrical phases (A, B, C) and being configured to be connected to a power grid via a switch at a Point of Common Coupling, PCC, the microgrid comprising;
    an energy storage, comprising a battery, connected to at least a first phase (A) and a second phase (B) of the plurality of phases;
    a plurality of first single-phase distributed generators, DG, connected to the first phase (A) and configured for injecting power into said first phase;
    a plurality of second single-phase DGs connected to the second phase (B) and configured for injecting power into said second phase;
    at least one first single-phase load connected to the first phase (A);
    at least one second single-phase load connected to the second phase (B); and
    a control system configured for controlling the microgrid such that the storage is charged by excess power from the second phase (B) and discharged by injecting power into the first phase (A), based on calculated power balances ($\Delta P$, $\Delta Q$) of each of the first and second phases;
    wherein a storage controller of the control system is configured for receiving information about calculated power balance ($\Delta P$, $\Delta Q$) of the first phase (A) from each of the plurality of first single-phase DGs and information about calculated power balance ($\Delta P$, $\Delta Q$) of the second phase (B) from each of the plurality of second single-phase DGs; and
    wherein the storage controller is configured for, based on the received information, calculating the amount of the excess power from the second phase to charge the storage and the amount of the power to inject into the first phase.

2. The microgrid of claim 1, wherein the microgrid is a three-phase microgrid, wherein the energy storage is connected to all the three phases (A, B, C) and the control system is configured for distributing power between all the three phases via the energy storage.

3. A method performed in a microgrid having a plurality of electrical phases (A, B, C) and being configured to be connected to a power grid via a switch at a Point of Common Coupling, PCC, the method comprising:
    obtaining information about available power generated by DG(s) in each of the first and second phases (A, B), as well as information about power demanded by a plurality of loads in each of the first and second phases, said information comprising information about calculated power balance ($\Delta P$, $\Delta Q$) of the first phase (A)

from each of a plurality of first single-phase DGs connected to the first phase and information about calculated power balance ($\Delta P$, $\Delta Q$) of the second phase (B) from each of a plurality of second single-phase DGs connected to the second phase;

calculating an amount of power to be redistributed based on the obtained information; and redistributing the amount of power to the first phase (A) of the plurality of phases from the second phase (B) of the plurality of phases via an energy storage, comprising a battery, connected to at least the first phase and the second phase by charging the storage with excess power from the second phase and discharging the storage by injecting power into the first phase.

4. The method of claim 3, further comprising:

detecting an event;

wherein the redistributing is commenced in response to the detected event.

5. The method of claim 4, wherein the detected event is any of obtaining an indication that the microgrid has lost its connection to the power grid, obtaining an indication that the power import to the microgrid from the power grid is below a predetermined threshold and/or obtaining an indication that here is a voltage drop in the microgrid.

6. The method of claim 3, further comprising:

before the step of redistributing power, reducing an amount of power supplied to a second single-phase load connected to the second phase (B).

7. The method of claim 3, wherein the power demanded by the plurality of loads only comprises power demanded by the plurality of loads which have been predetermined to have a high priority.

* * * * *